(12) United States Patent
Joo et al.

(10) Patent No.: US 9,201,624 B2
(45) Date of Patent: Dec. 1, 2015

(54) DISPLAY APPARATUS, CLIENT, IMAGE DISPLAY SYSTEM INCLUDING THE SAME, AND IMAGE DISPLAYING METHOD

(75) Inventors: Jae-il Joo, Suwon-si (KR); Ho-suk Chung, Seoul (KR); Kang-myeong Cho, Seoul (KR); Praveen Kashyap, Irvine, CA (US); Daniel Gicklhorn, Irvine, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 833 days.

(21) Appl. No.: 12/887,774

(22) Filed: Sep. 22, 2010

(65) Prior Publication Data

US 2011/0115818 A1 May 19, 2011

(30) Foreign Application Priority Data

Nov. 13, 2009 (KR) .................. 10-2009-0109936

(51) Int. Cl.
| | |
|---|---|
| *G06F 3/14* | (2006.01) |
| *G07F 17/32* | (2006.01) |
| *H04N 1/00* | (2006.01) |
| *H04L 29/06* | (2006.01) |
| *H04M 1/725* | (2006.01) |

(52) U.S. Cl.
CPC .............. *G06F 3/1423* (2013.01); *G07F 17/32* (2013.01); *G07F 17/3211* (2013.01); *G07F 17/3218* (2013.01); *G07F 17/3276* (2013.01); *G07F 17/3293* (2013.01); *H04L 67/38* (2013.01); *H04M 1/7253* (2013.01); *H04M 1/72544* (2013.01); *H04N 1/00127* (2013.01); *H04N 1/00244* (2013.01); *H04M 1/72525* (2013.01); *H04N 1/00347* (2013.01); *H04N 2201/0015* (2013.01); *H04N 2201/0086* (2013.01); *H04N 2201/0089* (2013.01)

(58) Field of Classification Search
USPC .............................................. 463/36; 273/292
See application file for complete search history.

(56) References Cited

U.S. PATENT DOCUMENTS

| | | | |
|---|---|---|---|
| 6,500,070 B1 | 12/2002 | Tomizawa et al. | |
| 7,306,516 B2 * | 12/2007 | Iosilevsky | ....................... 463/13 |

(Continued)

FOREIGN PATENT DOCUMENTS

| | | |
|---|---|---|
| EP | 1 857 987 A2 | 11/2007 |
| GB | 2353928 A | 3/2001 |

(Continued)

OTHER PUBLICATIONS

Communication dated Jan. 9, 2012 from the Korean Intellectual Property Office in counterpart Korean application No. 10-2009-0109936.

(Continued)

*Primary Examiner* — Phi Hoang
(74) *Attorney, Agent, or Firm* — Sughrue Mion, PLLC (57) ABSTRACT

Disclosed are a display apparatus, a client, an image display system including the same, and an image display method. The display apparatus includes a communication unit which communicates with at least one client; and a controller which receives server software for displaying a sharing image and at least one personal image from an exterior server, and executes the server software so that the sharing image is displayed on one of the display unit and the at least one client and the at least one personal image is displayed on the other of the display unit and the at least one client.

59 Claims, 8 Drawing Sheets

(56) References Cited

U.S. PATENT DOCUMENTS

| | | | |
|---|---|---|---|
| 7,445,549 B1* | 11/2008 | Best | 463/32 |
| 7,794,324 B2* | 9/2010 | White et al. | 463/29 |
| 2003/0200268 A1 | 10/2003 | Morris | |
| 2004/0252075 A1* | 12/2004 | Matsubara | 345/1.1 |
| 2005/0120381 A1 | 6/2005 | Yamaguchi | |
| 2005/0138193 A1 | 6/2005 | Encarnacion et al. | |
| 2005/0164789 A1* | 7/2005 | Nakamura et al. | 463/36 |
| 2005/0212214 A1* | 9/2005 | Pfeiffer et al. | 273/292 |
| 2005/0221897 A1* | 10/2005 | Oe | 463/42 |
| 2006/0068870 A1 | 3/2006 | Crawford, III et al. | |
| 2008/0227539 A1* | 9/2008 | Sato | 463/27 |
| 2008/0235747 A1 | 9/2008 | Choi | |
| 2009/0075724 A1* | 3/2009 | Breeding et al. | 463/25 |
| 2010/0069158 A1* | 3/2010 | Kim | 463/42 |
| 2011/0124401 A1* | 5/2011 | Durham et al. | 463/25 |

FOREIGN PATENT DOCUMENTS

| | | | |
|---|---|---|---|
| GB | 2442259 A | | 4/2008 |
| JP | 2000048224 A | | 2/2000 |
| JP | 2008220783 A | | 9/2008 |
| JP | 2009-055099 A | | 3/2009 |
| KR | 1020060112192 A | | 10/2006 |
| KR | 1020070015239 A | | 1/2007 |
| KR | 1020080065490 A | | 7/2008 |
| KR | 10-2008-0086262 A | | 9/2008 |
| KR | 10-2008-0093197 A | | 10/2008 |
| KR | 1020080088353 A | | 10/2008 |
| WO | 2007128949 A1 | | 11/2007 |
| WO | 2009026320 A1 | | 2/2009 |

OTHER PUBLICATIONS

Communication dated Jun. 20, 2011 issued in by the European Patent Office in counterpart European Patent Application No. 10187733.0.
Communication dated Mar. 19, 2012 issued by the Korean Intellectual Property Office in counterpart Korean Patent Application No. 10-2009-0109937.
Communication dated Nov. 25, 2011 issued by the Korean Intellectual Property Office in counterpart Korean Patent Application No. 10-2009-0109937.
Communication dated Jun. 23, 2011 issued by the International Searching Authority in International Application No. PCT/KR2010/006685.
Communication dated May 1, 2012 issued by the Korean Intellectual Property Office in counterpart Korean Patent Application No. 10-2009-0109936.
International Search Report dated May 18, 2011 in International Application No. PCT/KR2010/006681.
European Search Report dated Jun. 20, 2011 in corresponding European Application No. 10187685.2.
Communication dated Jul. 2, 2012 issued by the European Patent Office in counterpart European Application No. 10 187 733.0.
Communication dated Jul. 2, 2012 issued by the European Patent Office in counterpart European Application No. 10 187 685.2.
Communication issued Sep. 16, 2011 from the European Patent Office in counterpart European application No. 10187685.2.
Communication from the European Patent Office issued Feb. 14, 2014 in a counterpart European Application No. 13173303.2.
USPTO Office Action dated Jan. 30, 2014 issued in co-pending U.S. Appl. No. 12/887,831.
Communication dated Feb. 25, 2013 issued by the European Patent Office in counterpart European Patent Application No. 10187685.2.
Communication dated Feb. 25, 2013 issued by the European Patent Office in counterpart European Patent Application No. 10187733.0.
Communication, dated Sep. 11, 2013, issued by the Mexican Patent Office in counterpart Mexican Application No. MX/a/2012/005403.
Communication dated Aug. 1, 2013 issued by the European Patent Office in counterpart European Application No. 13173303.2.
Communication dated Aug. 23, 2013 issued by the European Patent Office in counterpart Application No. 13173670.4.
Izadi Shahram et al, "Dynamo: A public interactive surface supporting the cooperative sharing and exchange of media," Proceedings of the 16th Annual ACM Symposium on User Interface Software and Technology: Vancouver, Canada, Nov. 205, 2003, ACM Press, New York, NY, vol. 5, No. 2, XP002385943, pp. 159-168.
Communication dated Jun. 20, 2013 issued by the United States Patent and Trademark Office in U.S. Appl. No. 12/887,831.

* cited by examiner

DISPLAY APPARATUS, CLIENT, IMAGE DISPLAY SYSTEM INCLUDING THE SAME, AND IMAGE DISPLAYING METHOD

CROSS-REFERENCE TO RELATED APPLICATION

This application claims priority from Korean Patent Application No. 10-2009-0109936, filed on Nov. 13, 2009 in the Korean Intellectual Property Office, the disclosure of which is incorporated herein by reference.

BACKGROUND

1. Field

Exemplary embodiments relate to a display apparatus, a client, an image display system including the same, and an image display method, and more particularly, to a display apparatus capable of transmitting and receiving contents, a client, an image display system including the same, and an image display method.

2. Description of the Related Art

With recent developments regarding digital devices, various electronic devices can communicate with one another and thus transmit and receive various contents through the communication.

Also, such developments have brought digital convergence and are thus being applied to various fields, without limits regarding a communication type, a communication method and contents among the electronic devices.

Further, as the communication between consumer electronics (CE) becomes more prevalent, a user's demand for more varied display environments rises.

SUMMARY

Exemplary embodiments provide a display apparatus, a client, an image display system including the same capable of providing a video interface containing a sharing image and a personal image, and an image display method.

Another exemplary embodiment provides a display apparatus, a client, an image display system including the same capable of displaying contents arousing a user's interest, and an image display method.

According to an aspect of the exemplary embodiments, provided is a display apparatus including: a communication unit which communicates with at least one client; and a controller which receives server software for displaying a sharing image and at least one personal image from an exterior server, and executes the server software so that the sharing image is displayed on one of a display unit and the at least one client and the at least one personal image is displayed on the other of the display unit and the at least one client.

The controller may display the sharing image on the display unit, and personal contents containing information about the at least one personal image are individually transmitted to the at least one client.

The communication unit may communicate with a plurality of clients, and the at least one personal image comprises a plurality of personal images that differ according to each of the plurality of clients.

The controller may receive a user's input from the client, and changes the sharing image in accordance with the received user's input.

The controller may individually transmit one of a changed personal image relevant to each of the plurality of clients and data for changing the personal image relevant to each of the plurality of clients to the plurality of clients in accordance with the changed sharing image.

The controller may receive a user's input from at least one client, and individually transmit one of the changed personal image relevant to each of the plurality of clients and data for changing the personal image relevant to each of the plurality of clients to the plurality clients in accordance with the received user's input.

The controller may individually transmit one of the changed personal image relevant to each of the plurality of clients and data for changing the personal image relevant to each of the plurality of clients to the plurality of clients in accordance with a changed sharing image.

The controller may transmit contents containing information about the sharing image to a preset client so that the sharing image is displayed on the preset client.

The preset client may comprise a signal receiver to receive a broadcasting signal.

The communication unit may communicate with a plurality of clients, and the controller may display one of the at least one personal image on the display unit, and individually transmit additional personal contents containing information about other personal images of the at least one personal image to each of the remaining plurality of clients; wherein each personal image differs from another personal image.

The display apparatus may further comprise a user input unit for a user's input, wherein the controller changes the one of the at least one personal image displayed on the display unit in accordance with a user's input when receiving the user's input through the user input unit or from the client, and individually changes the other personal images and the sharing image of the client.

The personal contents may comprise application software, and may comprise a script.

The server software may comprise game software or multimedia contents.

According to another aspect of the exemplary embodiments there is provided an image display method of a display apparatus comprising a display unit and a communication unit which communicates with at least one client, the method including: receiving server software for displaying a sharing image and a personal image from an exterior; and executing the server software so that the sharing image is displayed one of the display unit and the at least one client and the personal image is displayed on the other of the display unit and the at least one client.

According to another aspect of the exemplary embodiments there is provided a client which communicates with a display apparatus that receives server software for displaying a sharing image and a personal image, the client including: a communication unit which communicates with the display apparatus; and a controller which controls the communication unit to receive contents containing information about one of the sharing image and the personal image from a displays apparatus, and processes and display the received contents on the display unit.

According to still another aspect of the exemplary embodiments, there is provided an image display method of a client which communicates with a display apparatus that receives server software for displaying a sharing image and a personal image, and the client including a display unit, the method including: receiving contents containing information about one of the sharing image and the personal image from the display apparatus; and processing and displaying the received contents on the display unit.

According to another aspect of the exemplary embodiments there is provided an image display system including a display apparatus; and at least one client which communicates with the display apparatus, wherein the display apparatus includes a first display unit; a first communication unit which communicates with the at least one client; and a first controller which receives server software for displaying a sharing image and a personal image from an exterior server, and executes the server software so that the sharing image is displayed on one of the first display unit and the at least one client and the personal image is displayed on the other of the display unit and the at least one client, and wherein the client includes a second display unit; a second communication unit which communicates with the display apparatus; and a second controller which controls the communication unit to receive contents containing information about one of the sharing image and the personal image from the display apparatus, and processes and displays the received contents on the display unit.

According to still another aspect of the exemplary embodiments, there is provided an image display method of an image display system including a display apparatus and at least one client communicatable with the display apparatus, the image display method including receiving server software for displaying a sharing image and a personal image on the display apparatus from an exterior server; displaying the sharing image on one of the display apparatus and the at least one client; and displaying the personal image on the other of the display unit and the at least one client.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

Figure 1:
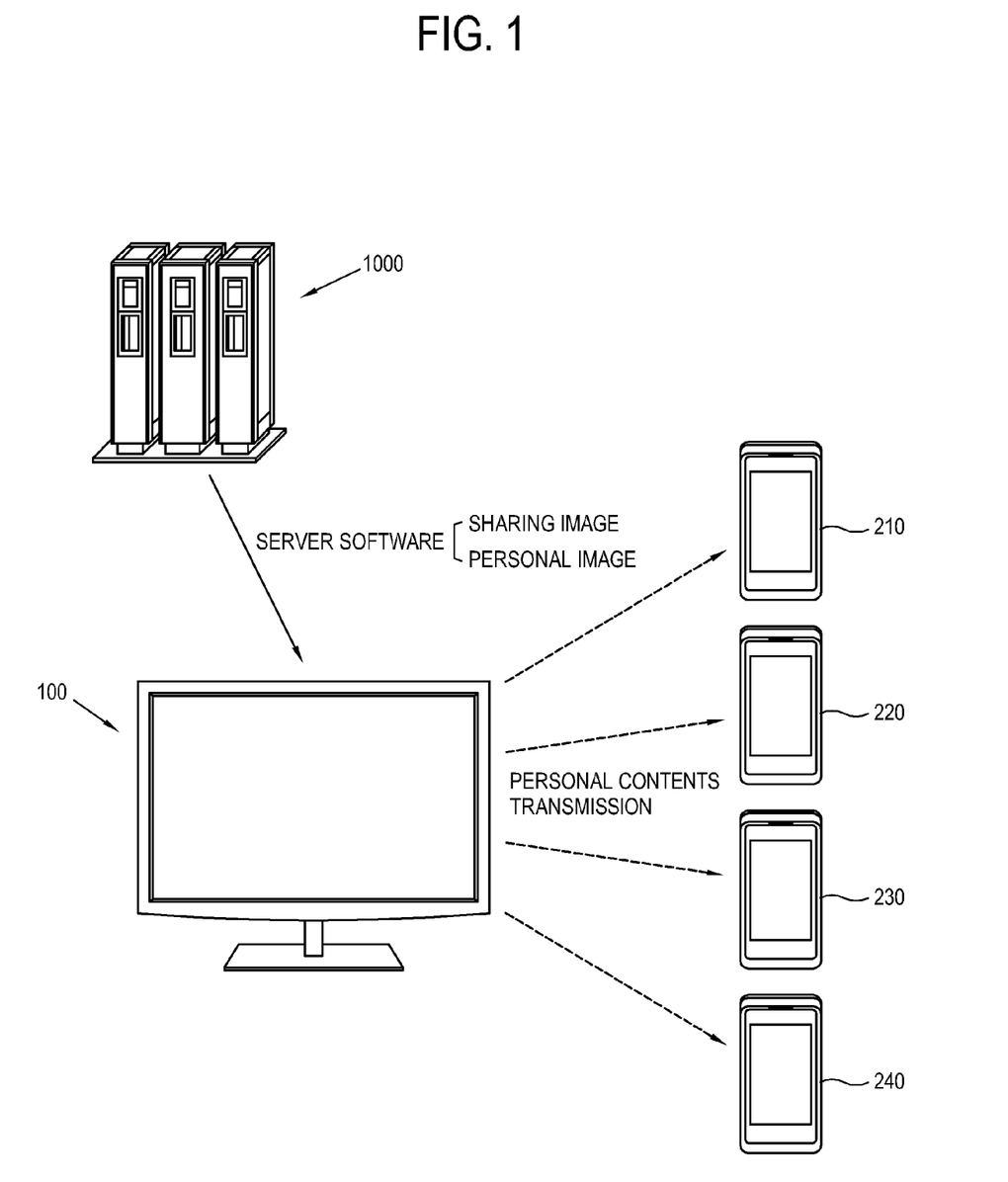
FIG. 1 shows an image display system according to an exemplary embodiment.
Figure 2:
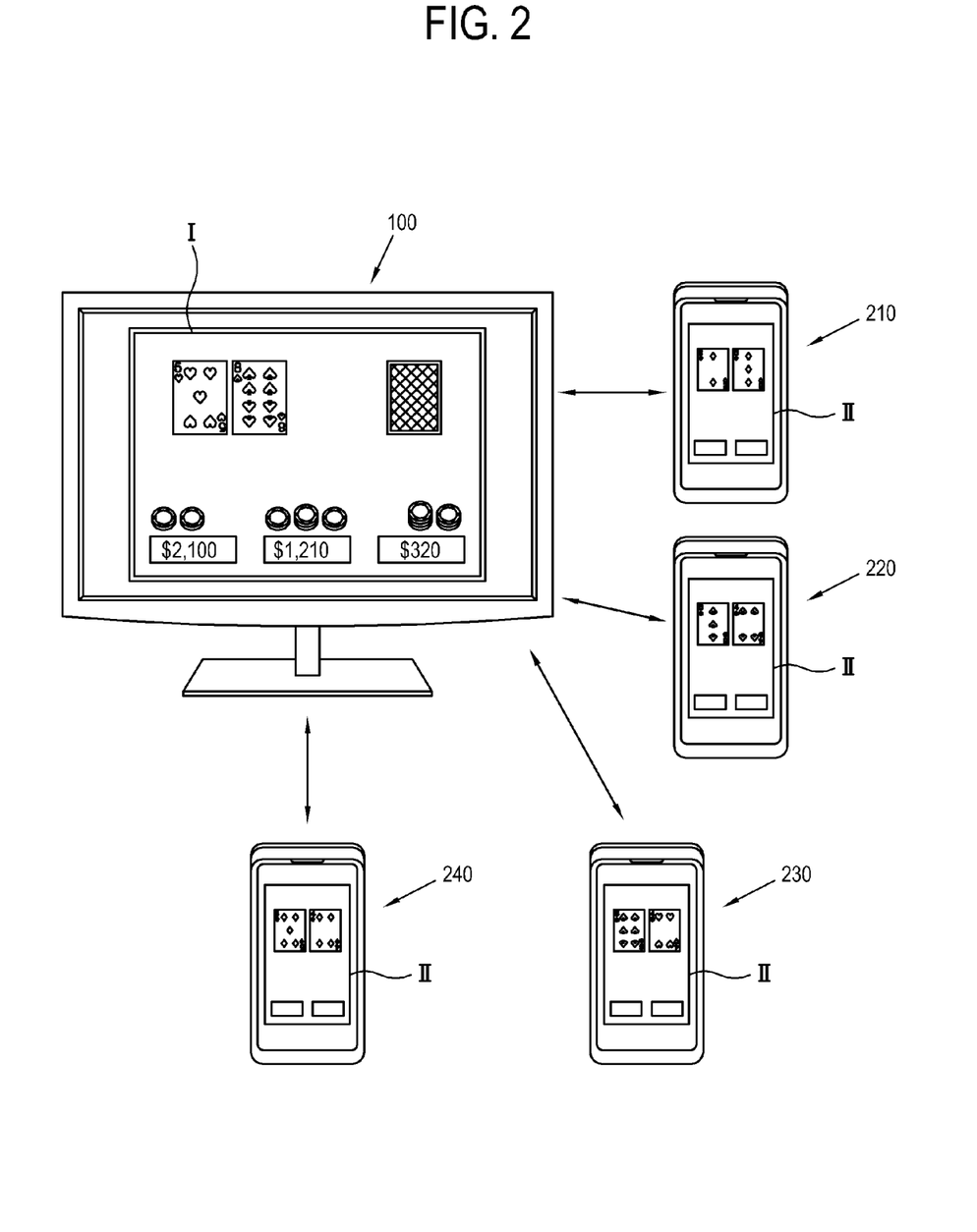
FIG. 2 shows contents displayed on the image display system of FIG. 1.

FIG. 1 is a view showing an image display system according to an exemplary embodiment, and FIG. 2 is a view showing contents displayed on the image display system of FIG. 1. As shown therein, an image display system comprises a display apparatus 100, and a plurality of clients 210, 220, 230 and 240 communicating with the display apparatus 100. The display apparatus 100 and each of the clients 210, 220, 230 and 240 communicate with each other and transmit and receive contents, data and various signals. The image display system receives server software for displaying a sharing image I and a personal image II from an external server 1000, and individually displays the sharing image I and the personal image II on the display apparatus 100 and the clients 210, 220, 230 and 240. The display apparatus 100 is an apparatus for receiving and executing the server software, which corresponds to a server that provides personal contents to the client 210, 220, 230 and 240.

In this exemplary embodiment, the display apparatus 100 that receives the server software includes a television for receiving a broadcasting signal, but is not limited thereto. Alternatively, the display apparatus 100 may include a monitor connected to a computer system or a large-sized display apparatus such as a large format display (LFD), such as a table top display that can be installed in a public place. The table top display is a display apparatus similar to a screen which is installed on various types of tables, which provides an interface allowing at least one user to perform multi-touch operations using a tool such as a hand or a pointer while viewing an image processed by an image processing apparatus such as a computer. This table top display supports multi-user and multi-touch operations, and is thus used in cooperative work. The multi-touch can be achieved by a capacitive type using variance in electric capacitance and a visual type using an optical device such as a camera or a thermal sensor or the like.

The client 210, 220, 230, 240, according to this exemplary embodiment, may include a mobile phone, a personal digital assistant (PDA), a portable multimedia player (PMP), a remote controller, etc. For convenience, a portable personal terminal may be used as the client, but is not limited thereto. Also, the number of clients is not limited. For example, one client and the display apparatus 100 can communicate with each other.

The server software is a content package containing all information about the sharing image I that has to be visible to all users using the clients 210, 220, 230 and 240, and the personal image II individually displayed on the respective clients 210, 220, 230 and 240. The server software is executed in the display apparatus 100. One of the sharing image I and each personal image II is varied depending on the other one, and the sharing image I and the personal images II are collectively controlled by the display apparatus 100. The server software may include execution files of various multimedia such as a still image, a moving picture, and an audio.

As shown in FIG. 2, the image display system displays a game image by way of example. If a poker game is displayed, the sharing image I displayed on the display apparatus 100 may include an image containing cards, chips or the like that all users have to see, but the personal image II may include an image about only his/her own cards concealed from other users. That is, the image display system in this exemplary embodiment displays the sharing image I and the personal image II on separate display apparatuses, thereby providing users with a new display environment which differs from the conventional ones. If the server software executed as described above is game software, users can enjoy a game through respective clients while viewing one sharing image I. As opposed to the conventional network game in which users individually play the game through a network, users can interactively enjoy a game in one space.

If the server software is educational software or conference software, the sharing image may include educational material or conference data to be shared and the personal image may be used as a notebook for each user. If the sharing image is an examination image to be shared, the personal image may include an answer sheet for each user. Besides, the server software may include a program to transact an auction or trade stocks.

Figure 3:
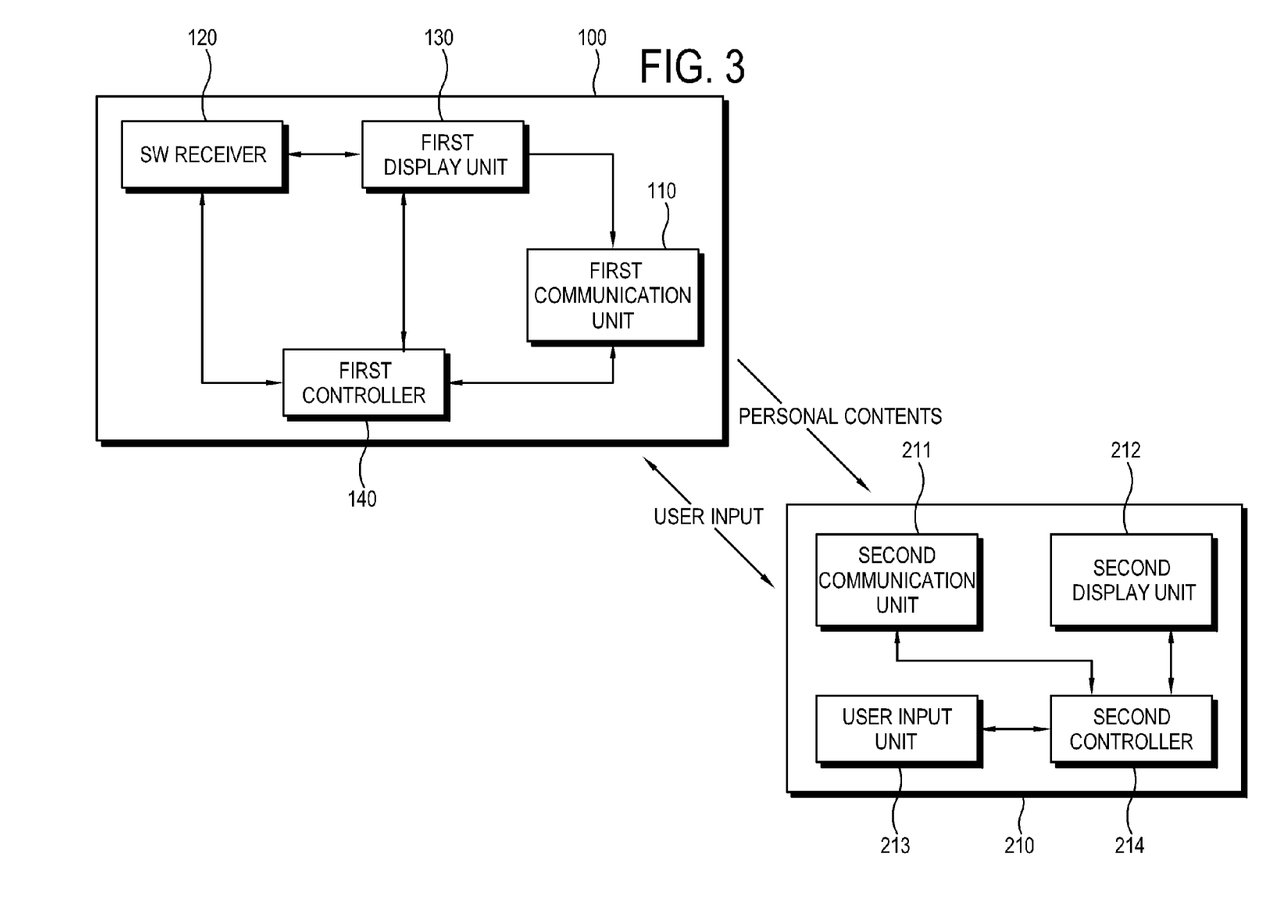
FIG. 3 is a control block diagram of the image display system in FIG. 1.

FIG. 3 is a control block diagram of the image display system in FIG. 1. As shown therein, the display apparatus 100 includes a first communication unit 110, a software (SW) receiver 120, a first display unit 130, and a first controller 140 that controls them and executes the server software. As a representative of the clients shown in FIG. 1, the first client 210 includes a second communication unit 211, a second display unit 212, a user input unit 213 and a second controller 214.

The first communication unit 110 and the second communication unit 211 may include a communication module corresponding to various communication methods such as Bluetooth, WiFi, ZigBee, infrared (IR) communication, radio frequency (RF) communication, and other wired communications. According to this exemplary embodiment, the display apparatus 100 and the clients 210, 220, 230 and 240 may communicate with each other through digital living network alliance (DLNA) established on the basis of previously built-up open standards, e.g., hypertext transfer protocol (HTTP), UPnP, WiFi, etc. The DLNA is focused on sharing all contents provided from a television (TV), a video cassette recorder (VCR), a digital camera, an audio system, etc., which aids in acquiring, transferring and managing digital media contents (e.g., photographs, music, video, etc.) from a private device such as a mobile device, a personal computer, etc. The first communication unit 110 and the second communication unit 211 may transmit and receive an image, a user's input, contents, various control signals, etc. through a network based on the DLNA.

The first controller 140 of the display apparatus 100 searches the client through the first communication unit 110, sets up and releases a target client, and transmits personal contents and various signals to the clients. Also, the client 210 transmits an access request signal, an access release signal, and a user manipulation signal to the display apparatus 100 through the second communication unit 211.

The SW receiver 120 receives the server software for displaying the sharing image I and the personal image II from an external server (not shown). The server software is compiled application software to be executed as an execution image in the display apparatus 100. If the server software is executed, the sharing image I is displayed on the display apparatus 100, and the personal contents containing the personal image II to be displayed on the clients 210, 220, 230 and 240 are provided to the clients 210, 220, 230 and 240. The personal contents may be the application software, or may be a script to be processed by a browser of the client 210, 220, 230 and 240. For example, the personal contents include the script to be processed regardless of a platform of the client 210, 220, 230 and 240.

The SW receiver 120 may include a broadcast receiver to receive a broadcasting signal. Also, the SW receiver 120 may use a network such as Internet, Ethernet, a public switched telephone network (PSTN), or may use a one-to-one network. Further, the SW receiver 120 may receive the server software stored in an internal storage (not shown). The external server may include a broadcasting station, and a network server. The external server stores the server software, and transmits the server software to the display apparatus 100 in response to a request signal for the server software.

The first display unit 130 and the second display unit 212 display images respectively processed by the controllers 140 and 214. Each of the first display unit 130 and the second display unit 212 may include a liquid crystal display (LCD) panel having a liquid crystal and an organic light emitting diode (OLED) panel having an OLED, and a panel driver for driving the panel.

The first controller 140 executes the received server software to display the sharing image I on the first display unit 130, and transmits the personal contents containing information about the personal image to the clients 210, 220, 230 and 240. The server software includes metadata about the personal contents, and the first controller 140 transmits the personal contents to the respective clients 210, 220, 230 and 240 on the basis of the metadata. Here, the metadata refers to data given to the contents according to certain rules in order to efficiently search and use desired information among a massive amount of information. In this exemplary embodiment, the metadata includes location and contents of the personal contents, information about a writer, a right condition, a use condition, a use history, etc. Further, the first controller 140 changes the sharing image I and the personal image II in response to a user's input or according to the execution of the server software. In general, since the server software is transferred as being compressed, the first controller 140 may include application for decompressing the server software, a decoding module and a scaler for displaying the sharing image I on the first display unit 130, and an audio processing module for processing an audio signal if the sharing contents include an audio signal.

The second controller 214 processes the personal contents transferred from the display apparatus 100 and displays the personal image II on the second display unit 212. The second controller 214 may further include a buffer unit (not shown) for temporarily storing the personal contents received through the second communication unit 211. In the case of a portable personal terminal, input data from the exterior may not be stored in a non-volatile storage for system protection of the terminal. Thus, the client 210 buffers the transferred personal contents to a buffering unit. Like the first controller 140, the second controller 214 may include modules for processing a video and an audio.

The user input unit 213 of the client 210 is an interface allowing a user to input a user manipulation signal for adjusting, manipulating or controlling the personal image II. The user input unit 213 may be achieved by various buttons, a remote controller having various buttons, a touch panel allowing a user to input his/her selection using a pointing device, etc.

The sharing image I and the personal image II are displayed on the different display units, i.e., on the first display unit 130 and the second display unit 212, respectively, but the two images I and II are displayed as being interlocked with each other. In other words, one of the two images I and II is changed in accordance with change of the other image, or induces the other image to change. The first controller 140 controls the second controller 214 to change the sharing image I and the personal image II as they are interlocked with each other, and to display the changed contents. The personal image II displayed on the second display unit 212 of each client 210, 220, 230, 240 is an image specialized according to the clients 210, 220, 230 and 240, which can be changed by not only the sharing image but also the personal image II displayed on other client 210, 220, 230, 240.

Figure 4:
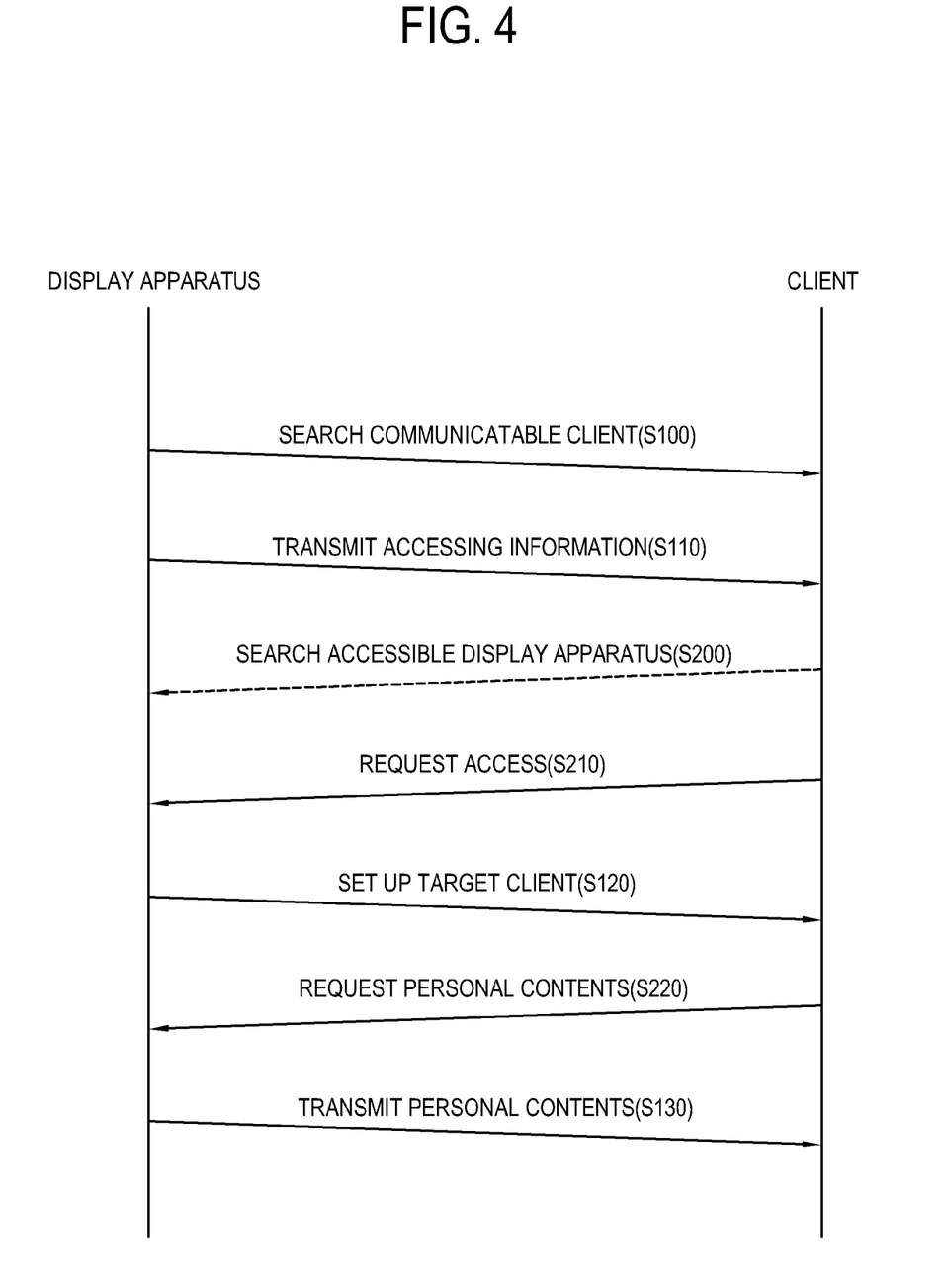
FIG. 4 is a control flowchart for explaining a process of connecting a display apparatus and a client in FIG. 1.

FIG. 4 is a control flowchart for explaining a process of connecting a display apparatus and a client in FIG. 1. First, connection for communication between the display apparatus 100 and the clients 210, 220, 230 and 240 will be described with reference to FIG. 4.

The display apparatus 100 searches a communicatable client at operation S100, and transmits accessing information for notifying an accessible state to the searched client at operation S110. In the image display system, since the display apparatus 100 is employed as a server with regard to the clients 210, 220, 230 and 240, the display apparatus 100 needs to collect information about currently accessible clients, accessed clients, clients trying a new access, or the like. In other words, the display apparatus 100 searches the clients so as to correctly and easily manage an accessing state of the clients.

On the other hand, the clients 210, 220, 230 and 240 may search an accessible display apparatus 100 through the second communication unit 211 at operation S200. The clients 210, 220, 230 and 240 may search not only the display apparatus 100 but also other clients currently accessed to the display apparatus 100.

The clients 210, 220, 230 and 240 that recognize accessibility to the display apparatus 100 by receiving the accessing information or by searching within itself, request access to the display apparatus 100 at operation S210.

At operation S120, the display apparatus 100 sets up the clients 210, 220, 230 and 240, which request the access among the communicatable clients, as target clients to which the personal contents can be transmitted.

At operation S220, the clients 210, 220, 230 and 240 requests the display apparatus 100 to transmit the personal contents. In response to the request, the display apparatus 100 transmits the personal contents to the clients 210, 220, 230 and 240 at operation S130. Here, an access request signal transmitted from the clients 210, 220, 230 and 240 to the display apparatus 100 may include a signal for requesting the personal contents. That is, the display apparatus 100 may regard the access request signal as a content requesting signal when receiving the access request signal, and transmit the personal contents to the clients from which the access request signal is transmitted.

Although it is not shown, if the target client transmits an access release signal for releasing the access, the display apparatus 100 releases the access with the target client that transmits the access release signal.

Figure 5:
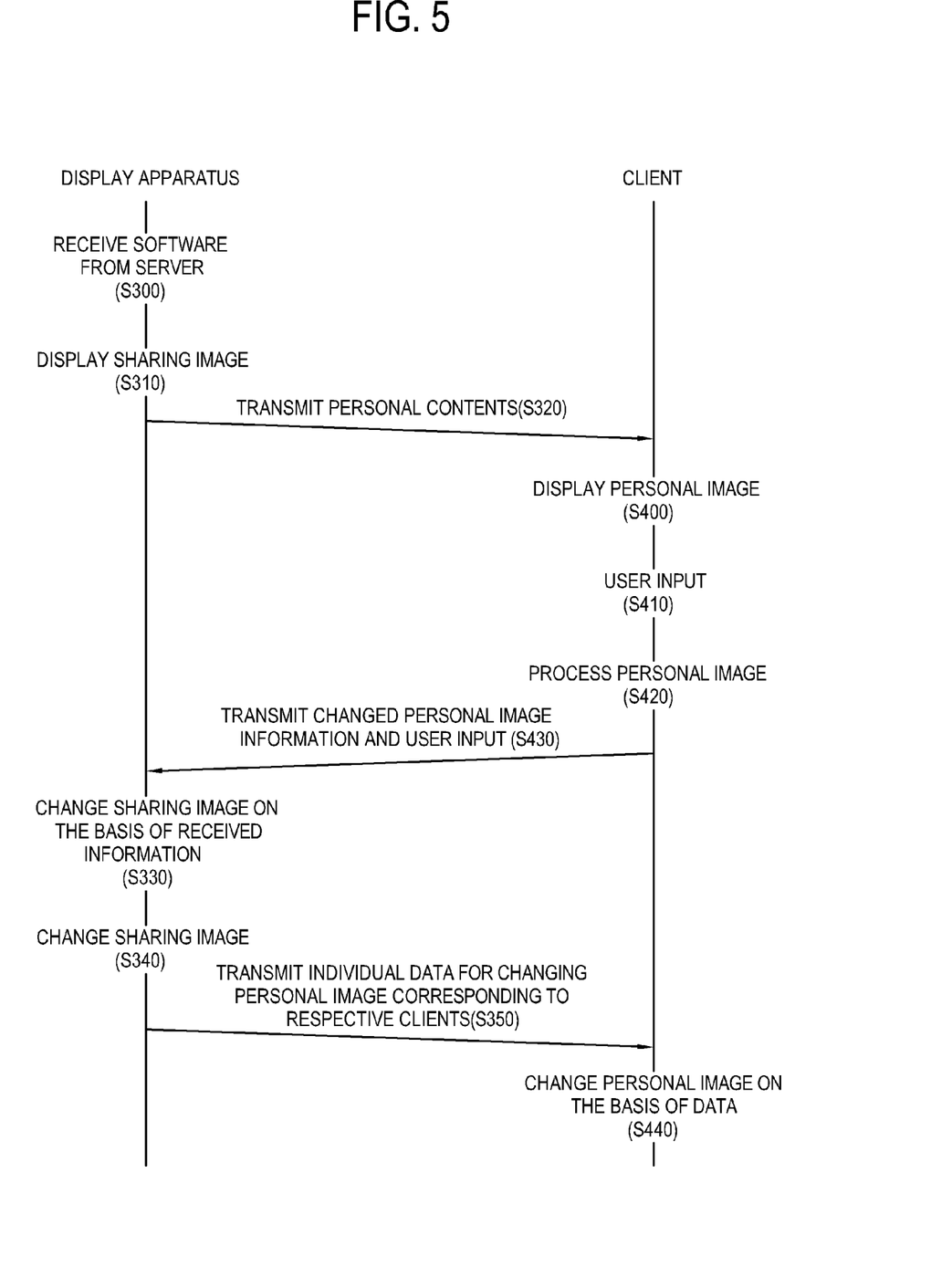
FIG. 5 is a control flowchart for explaining an image display method in the image display system of FIG. 1.

FIG. 5 is a control flowchart for explaining an image display method in the image display system of FIG. 1. Below, a process that the sharing image I and the personal image II are changed by the first controller 140 as being interlocked with each other will be described with reference to FIG. 5.

First, the display apparatus 100 receives the server software from the external server at operation S300, in which the server software contains information about the sharing image I to be displayed on the first display unit 130 and the personal image II to be displayed on the clients 210, 220, 230 and 240.

The operation that the display apparatus 100 receives the server software is performed before transmitting the personal contents to the clients 210, 220, 230 and 240.

The display apparatus 100 processes the received server software by the first controller 140, and then displays the sharing image I on the first display unit 130 at operation S310 and transmits the personal contents to the clients 210, 220, 230 and 240 that request the personal contents at operation S320.

The clients 210, 220, 230 and 240 process the personal contents received through the second communication unit 211 by the second controller 214, and displays the personal image II on the second display unit 212 at operation S400. The personal contents may include a script. In this case, the clients 210, 220, 230 and 240 may download software, e.g., a browser capable of processing the script from the external server. Since the personal contents are processed by the browser regardless of a platform, the clients 210, 220, 230 and 240 need not download a separate application for processing the personal contents. In other words, the clients 210, 220, 230 and 240 can execute the personal contents provided from the display apparatus 100 without downloading separate applications for executing various kinds of personal contents.

At operation S410, a user may make an input for manipulating the personal image II through the user input unit 213. At operation S420, the second controller 214 processes the personal image II in response to the user's input. For example, in the case of a poker game, a user may perform manipulation such as opening one of his/her cards, betting or giving up the game, and correspondingly the second controller 214 changes the personal image.

The client 210, 220, 230, 240 transmits information about the changed personal image II, a received user's input itself, or a control signal based on a user's input to the display apparatus 100 at operation S430.

At operation S330, the display apparatus 100 changes the sharing image I to correspond to the received information, i.e., the changed personal image or a user's input. If a certain user opens a card, begins betting or gives up the game on the way, the display apparatus 100 correspondingly changes the sharing image I.

At operation S340, the display apparatus 100 may change the sharing image I while executing the server software without responding to the user's input. For example, the execution of the sever software may allow the display apparatus 100 to become as one game player and take part in the game. In this case, the sharing image I may be changed without a user's input.

If the sharing image is changed through any route or there is information to be provided to each of the clients 210, 220, 230 and 240, the display apparatus 100 individually transmits information to the respective clients 210, 220, 230 and 240 in order to change the personal images II corresponding to the clients 210, 220, 230 and 240, respectively. At operation S350, the display apparatus 100 individually transmits data independent of each other to the respective clients 210, 220, 230 and 240 so as to individually change the personal images II corresponding to the clients 210, 220, 230 and 240, respectively. Here, the data may include image-composition information about the personal image needed to change, and various control and command signals.

At operation S440, the clients 210, 220, 230 and 240 changes the personal images II on the basis of the received data, respectively.

When receiving a user's input from one of the plural clients 210, 220, 230 and 240, the first controller 140 of the display apparatus 100 correspondingly changes at lest one of the sharing image I and the personal images of the other clients.

As described above, the sharing image and the personal image are changed as being interlocked with each other, and the first controller 140 controls the second controller 214 so that the personal images of the individual clients 210, 220, 230 and 240 can be changed corresponding to the change in the sharing image or the personal image of other clients.

When receiving a user's input, the clients 210, 220, 230 and 240 in this exemplary embodiment processes and changes their own personal images II by themselves while providing the user's input to the display apparatus 100. According to another exemplary embodiment, the clients 210, 220, 230 and 240 may provide a user's input to the display apparatus 100 and then receive changed information of the personal image II corresponding to the relevant user's input from the display apparatus 100. In other words, the clients 210, 220, 230 and 240 transmit the received user's input to the display apparatus 100, and all image processing may be performed in the display apparatus 100. In this case, the clients 210, 220, 230 and 240 serve to display the personal image II depending on the received information.

Figure 6:
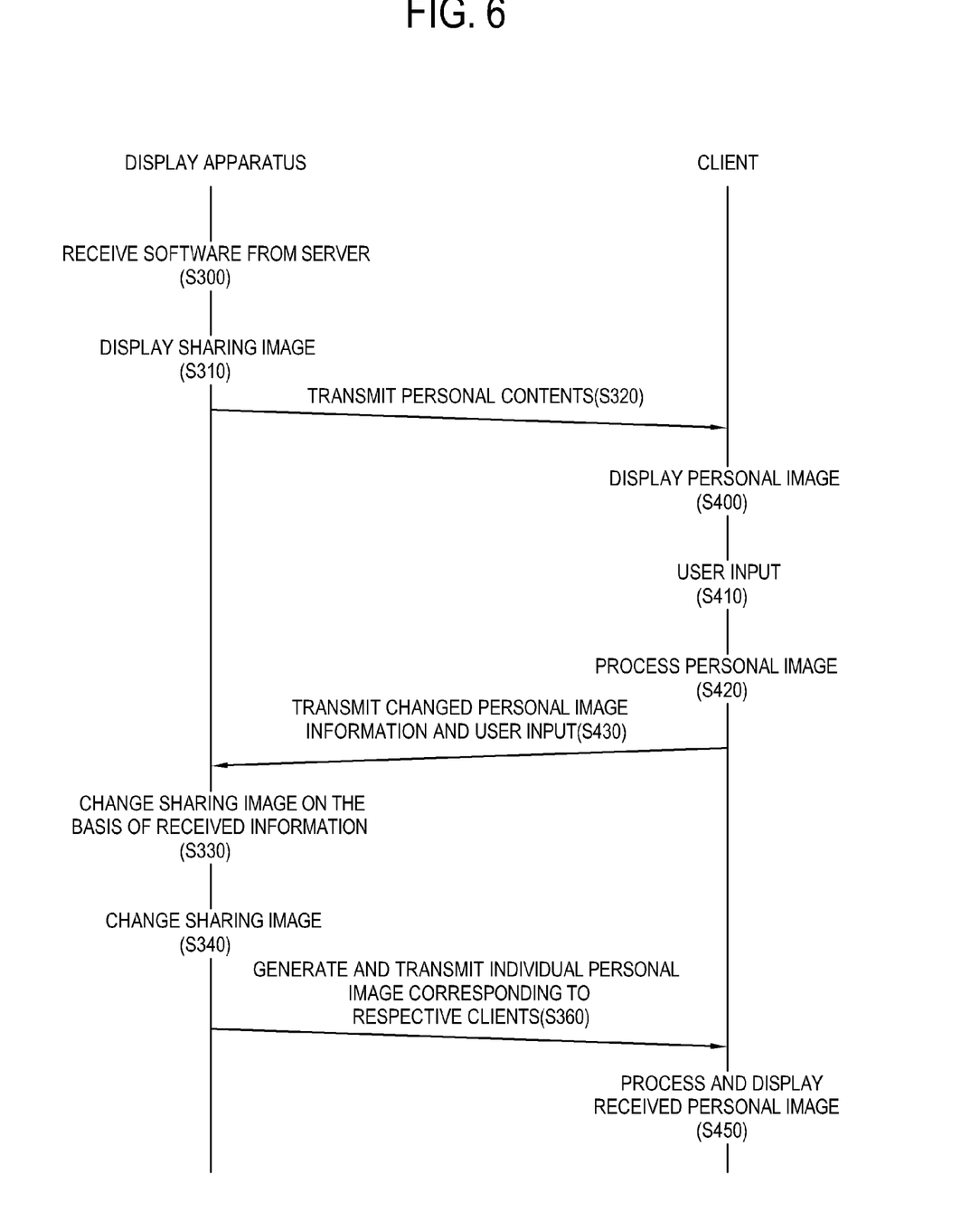
FIG. 6 is a control flowchart for explaining another image display method in the image display system of FIG. 1.

FIG. 6 is a control flowchart for explaining another image display method in the image display system of FIG. 1.

Basic control operations that the display apparatus 100 and the client 210, 220, 230 and 240 are accessed to each other and start communication, and the sharing image I and the personal image II are changed by the first controller 140 are the same as those of FIG. 3.

In this exemplary embodiment, if the personal images II have to be changed, at operation S360 the display apparatus 100 generates the personal images and transmits them to the clients 210, 220, 230 and 240 without transmitting data, control and command signals about the personal images II to be changed. At operation S450, the second controller 214 receives the personal image II generated in the display apparatus 100 and performs only a process for displaying it on the second display unit 212. In this case, it is advantageous to reduce a load of processing the data in the client 210, 220, 230 and 240. Also, it is possible to display the personal contents regardless of the platforms of the clients 210, 220, 230 and 240 even though personal contents are not a script but application software.

According to another exemplary embodiment, communication may be enabled between the plural clients 210, 220, 230 and 240. In other words, the clients 210, 220, 230 and 240 may transmit and receive a text or an image among themselves. For example, in the case of playing a game or making a note, it is possible to exchange a message with other clients or show his/her personal image II to other clients. Communication among the clients 210, 220, 230 and 240 may be achieved by short message service (SMS) or peer to peer (P2P).

Figure 7:
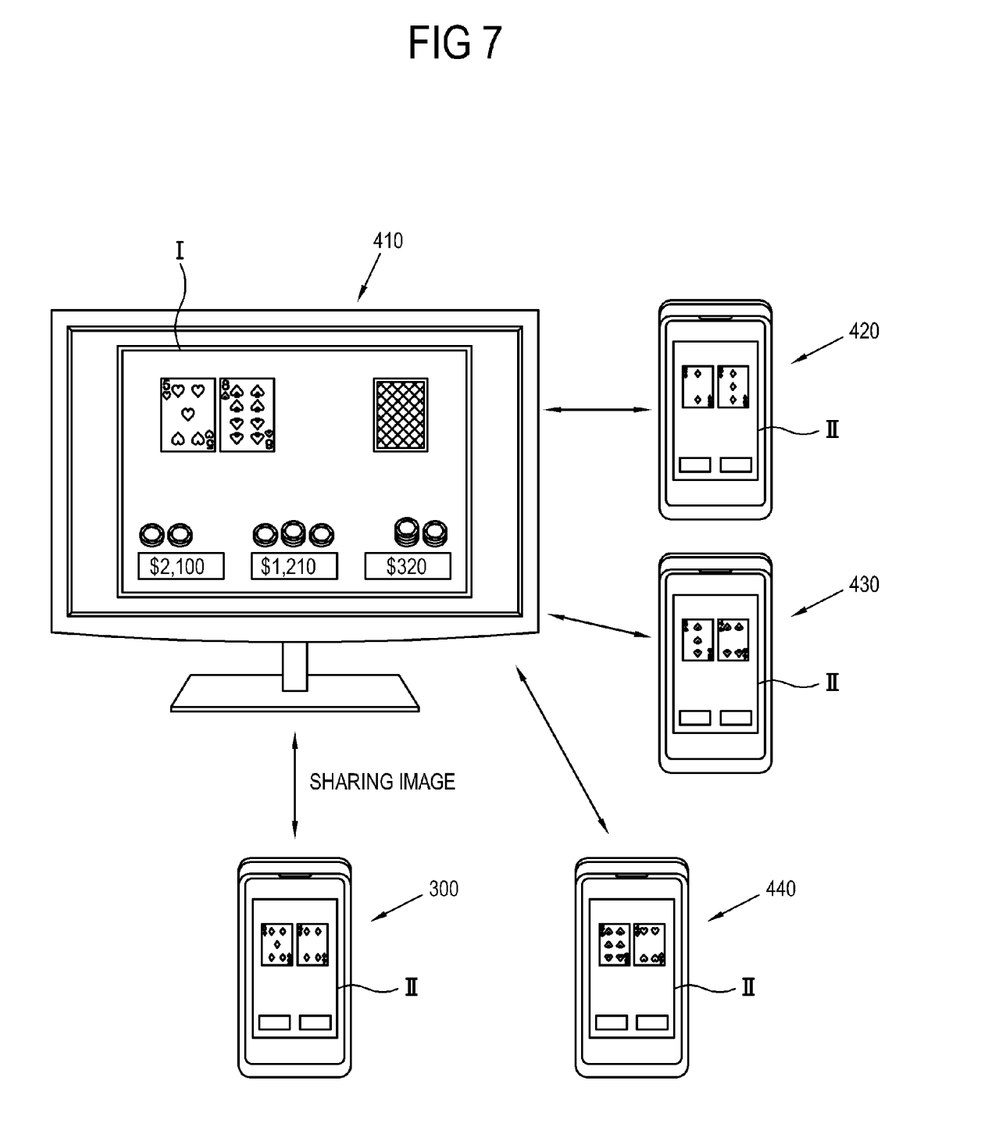
FIG. 7 shows an image display system according to another exemplary embodiment.

FIG. 7 is a view showing an image display system according to another exemplary embodiment.

In the image display system according to this exemplary embodiment, a display apparatus 300 for receiving the server software is achieved by not a stationary display apparatus but a personal portable terminal. The display apparatus 300 receives the server software from an external server. The display apparatus 300 transmits contents containing information about the sharing image I to a preset client 410 so that the sharing image I can be displayed on the preset client 410, displays one of personal images II different from one another on its own display unit, and individually transmits personal contents containing information about the other personal images II to the other clients 420, 430 and 440. In the foregoing exemplary embodiment, the sharing image I is displayed on a device that receives the server software. However, in this exemplary embodiment, the personal image II is displayed on the server that receives the server software, and the sharing image I is displayed on a preset client 410 having a larger screen than the display apparatus 300. The display apparatus 300 in this exemplary embodiment may further include a user input unit (not shown) for manipulating the personal image II.

If the display apparatus 300 and the plurality of clients 410, 420, 430 and 440 are connected to each other, the display apparatus 300 selects a sharing client 410 for displaying the sharing image I on the basis of information of the accessed clients 410, 420, 430 and 440. Among the clients, a television or a device having a large-sized display unit may be selected as the sharing client 410.

The display apparatus 300 transmits the contents about an image to be displayed on the clients 410, 420, 430 and 440, respectively, and executes the server software, thereby changing the sharing image I and the personal image II as being interlocked with each other.

Figure 8:
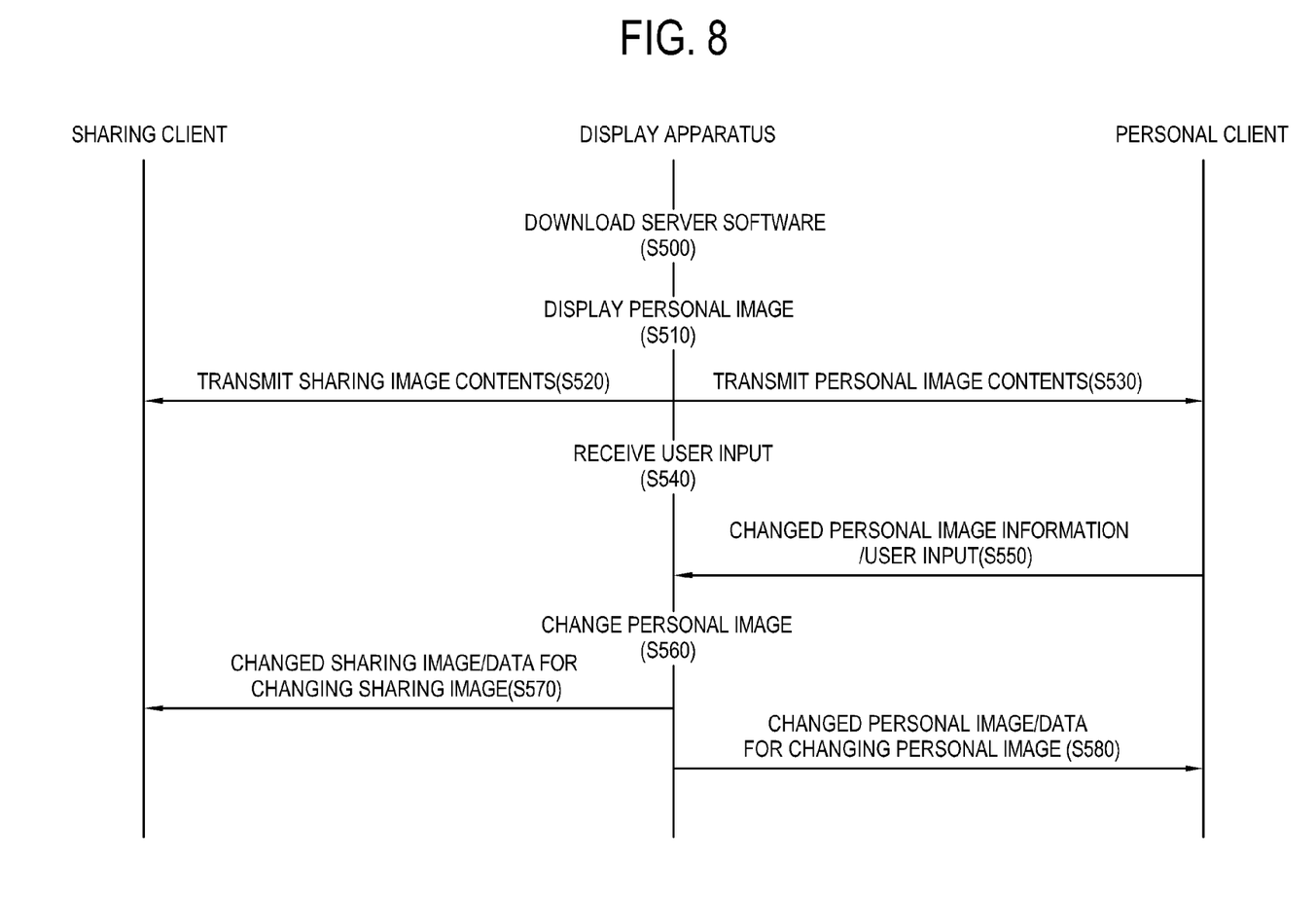
FIG. 8 is a control flowchart for explaining an image display method in the image display system of FIG. 7.

FIG. 8 is a control flowchart for explaining an image display method in the image display system of FIG. 7. Referring to FIG. 8, the image display method of the image display system is as follows.

At operation S500, the display apparatus 300 downloads the server software from an exterior server. In this case, the display apparatus 300 may have an operating system capable of executing the downloaded server software.

The display apparatus 300 executes the server software to display one of the personal images II on its own display unit at operation S510, and transmits the relevant contents to the clients 410, 420, 430 and 440, respectively. In other words, contents containing information about the sharing image are transmitted to the sharing client 410 at operation S520, and the personal contents containing information about the personal image are transmitted to other clients 420, 430 and 440 at operation S530.

If receiving a user's input through the user input unit at operation S540 or if receiving information about the changed personal image or a user's input from the clients 420, 430 and 440 that are displaying the personal image II at operation S550, the display apparatus 300 changes its own personal image II at operation S560.

Then, the changed sharing image or data for changing the sharing image is transmitted to the sharing client 410 at operation S570, and the changed personal image or data for changing the personal image is transmitted to the other clients 420, 430 and 440 at operation S580. The operations of transmitting and receiving the information according to a user's input or change in the image are generally similar to those described with reference to FIGS. 4 and 5.

As apparent from the above description, the sharing image and the personal image are controlled as being interlocked with each other while displaying different images on a display apparatus communicating with a client, thereby providing a new video interface different from a conventional one. Such a video interface provides a game environment for promoting friendship among a plurality of users, and an environment for allowing each user to control a personal image involved in the opened sharing image in a public place.

As described above, according to an exemplary embodiment, there are provided a display apparatus capable of providing a video interface containing a sharing image and a personal image, a client, an image display system including the same, and an image display method.

Also, according to the exemplary embodiment, there are provided a display apparatus capable of displaying contents arousing a user's interest, a client, an image display system including the same, and an image display method.

Further, according to another exemplary embodiment, there are provided a display apparatus capable of easily downloading and executing contents, a client, an image display system including the same, and an image display system.

Although a few exemplary embodiments have been shown and described, it will be appreciated by those skilled in the art that changes may be made in these embodiments without departing from the principles and spirit of the invention, the scope of which is defined in the appended claims and their equivalents.

What is claimed is:

1. A portable display apparatus comprising:
a communication unit which wirelessly communicates with a plurality of client devices;
a display unit; and
a controller which receives server software for displaying a sharing image and a plurality of personal images from an exterior server other than the plurality of client devices, and executes the server software, displays a personal image of the plurality of personal images on the display unit of the portable display apparatus, selects a sharing client device for displaying the sharing image from among the plurality of client devices based on information of the plurality of client devices, wirelessly transmits information about the sharing image to the sharing client device via the communication unit and wirelessly transmits information about another personal image of the plurality of personal images to a personal client device of the plurality of client devices excluding the sharing client device via the communication unit,
wherein the communication unit, the display unit and the controller are disposed in the portable display apparatus.

2. The display apparatus according to claim 1, wherein personal contents containing information about a personal image of the plurality of personal images are individually transmitted to the plurality of client devices excluding the sharing client device.

3. The display apparatus according to claim 2, wherein the plurality of personal images differ according to each of the plurality of client devices excluding the sharing client device.

4. The display apparatus according to claim 3, wherein the controller receives a user's input and transmits the user's input to the sharing client device to change the sharing image in accordance with the received user's input.

5. The display apparatus according to claim 4, wherein the controller individually transmits one of a changed personal image and data for changing the personal image to the plurality of client devices excluding the sharing client device in accordance with the changed sharing image.

6. The display apparatus according to claim 3, wherein the controller receives a user's input from at least one client device, and individually transmits one of a changed personal image and data for changing the personal image to the plurality of client devices excluding the sharing client device in accordance with the received user's input.

7. The display apparatus according to claim 3, wherein the controller individually transmits one of a changed personal image and data for changing the personal image to the plurality of client devices excluding the sharing client device in accordance with a changed sharing image.

8. The display apparatus according to claim 2, wherein the personal contents comprise application software.

9. The display apparatus according to claim 2, wherein the personal contents comprise a script.

10. The display apparatus according to claim 1, wherein the sharing client device comprises a signal receiver to receive a broadcasting signal.

11. The display apparatus according to claim 1, further comprising a user input unit for a user's input,
wherein the controller changes the personal image displayed on the display unit in accordance with a user's input when receiving the user's input through the user input unit or from the personal client device.

12. The display apparatus according to claim 1, wherein the server software comprises game software.

13. The display apparatus according to claim 1, wherein the server software comprises multimedia contents.

14. An image display method of a portable display apparatus comprising a display unit, a control unit and a communication unit which wirelessly communicates with a plurality of client devices, the method comprising:
receiving server software for displaying a sharing image and a plurality of personal images from an exterior server other than the plurality of client devices; and
executing by the control unit, the server software, displaying by the control unit, a personal image of the plurality of personal images on the display unit of the portable display apparatus, selecting by the control unit, a sharing client device for displaying the sharing image from among the plurality of client devices based on information of the plurality of client devices, wirelessly transmitting by the control unit, information about the sharing image to the sharing client device via the communication unit and wirelessly transmitting by the control unit, information about another personal image of the plurality of personal images to a personal client device of the plurality of client devices excluding the sharing client device via the communication unit,
wherein the communication unit, the display unit and the control unit are disposed in the portable display apparatus.

15. The method according to claim 14, wherein personal contents containing information about a personal image of the plurality of personal images are individually transmitted to the plurality of client devices excluding the sharing client device.

16. The method according to claim 15, wherein the plurality of personal images differ according to each of the plurality of client devices excluding the sharing client device.

17. The method according to claim 16, further comprising receiving a user's input from the personal client device; and
transmitting information about changed sharing image to the sharing client device in accordance with the received user's input.

18. The method according to claim 17, further comprising individually transmitting one of a changed personal image and data for changing the personal image to the plurality of client devices excluding the sharing client device in accordance with the changed sharing image.

19. The method according to claim 16, further comprising receiving a user's input from at least one client device; and
individually transmitting one of a changed personal image and data for changing the personal image to the plurality of client devices excluding the sharing client device in accordance with the received user's input.

20. The method according to claim 14, wherein the sharing client device comprises a signal receiver to receive a broadcasting signal.

21. The method according to claim 20, wherein each personal image of the plurality of personal images differs from another personal image.

22. The method according to claim 21, wherein the display apparatus further comprises a user input unit for a user's input, and
the method further comprises changing the personal image displayed on the display unit in accordance with a user's input when receiving the user's input through the user input unit or from the personal client device, and individually changing other personal images of the plurality of images and the sharing image.

23. A portable display apparatus which receives server software for displaying a sharing image and a plurality of personal images, the display apparatus comprising:

a communication unit which wirelessly communicates with a plurality of client devices;
a display unit; and
a controller which receives the server software for displaying the sharing image and the plurality of personal images from an exterior server other than the plurality of client devices, selects a sharing client device for displaying the sharing image from among the plurality of client devices based on information of the plurality of client devices, controls the communication unit to wirelessly transmit information about the sharing image to the sharing client device via the communication unit, and processes and displays a personal image of the plurality of personal images on the display unit of the portable display apparatus and controls the communication unit to wirelessly transmit information about another personal image of the plurality of personal images to a personal client device of the plurality of client devices excluding the sharing client device via the communication unit,
wherein the communication unit, the display unit and the controller are disposed in the portable display apparatus.

24. The display apparatus according to claim 23, further comprising a broadcasting receiver to receive a broadcasting signal.

25. The display apparatus according to claim 24, wherein the controller transmits data for changing the sharing image to the sharing client device to change the sharing image on the basis of the data.

26. The display apparatus according to claim 23, wherein the controller processes contents containing information about one personal image received from the personal client device, and displays the one personal image on the display unit.

27. The display apparatus according to claim 26, further comprising a user input unit for a user's input, and
the controller processes the one personal image in accordance with the user's input, and transmits the user's input to the personal client device.

28. The display apparatus according to claim 26, further comprising a user input unit for a user's input, and
the controller transmits a changed personal image corresponding to the user's input to the personal client device.

29. The display apparatus according to claim 26, further comprising a user input unit for a user's input, and
the controller transmits data for changing the personal image corresponding to the user's input to the personal client device to change the personal image on the basis of the data.

30. The display apparatus according to claim 23, wherein contents containing the information comprise a script.

31. The display apparatus according to claim 30, wherein the communication unit receives software for processing the script from an external server.

32. An image display method of a portable display apparatus which wirelessly communicates with a plurality of client devices and receives server software for displaying a sharing image and a plurality of personal images, the display apparatus comprising a communication unit, a display unit and a control unit, the method comprising:
receiving the server software for displaying the sharing image and the plurality of personal images from an exterior server other than the plurality of client devices;
selecting by the control unit of the portable display apparatus, a sharing client device for displaying the sharing image from among the plurality of client devices based on information of the plurality of client devices;
wirelessly transmitting by the control unit, information about the sharing image to the sharing client device via the communication unit and wirelessly transmitting by the control unit, information about a personal image of the plurality of personal images to a personal client device of the plurality of client devices excluding the sharing client device via the communication unit; and
displaying by the control unit of the portable display apparatus, another personal image of the plurality of personal images on the display unit,
wherein the communication unit, the display unit and the control unit are disposed in the portable display apparatus.

33. The method according to claim 32, further comprising a broadcasting receiver to receive a broadcasting signal.

34. The method according to claim 33, further comprising
transmitting data for changing the sharing image to the sharing client device; and
changing the sharing image on the basis of the data.

35. The method according to claim 32, wherein the displaying the image comprises processing contents containing information about the other image of the plurality of personal images.

36. The method according to claim 35, wherein the display apparatus further comprises a user input unit for a user's input, and
the method further comprises processing a personal image of the plurality of personal images in accordance with the user's input when receiving the user's input, and transmitting information of the user's input to the sharing client device.

37. The method according to claim 35, wherein
the display apparatus further comprises a user input unit for a user's input, and
the method further comprises
transmitting a changed personal image corresponding to the user's input to the personal client device.

38. The method according to claim 35, wherein
the display apparatus further comprises a user input unit for a user's input, and
the method further comprises
transmitting data for changing one personal image corresponding to the user's input to the personal client device; and
changing the one personal image on the basis of the data.

39. The method according to claim 32, wherein contents containing the information about the personal image comprise a script, and
the method further comprises receiving software for processing the script from an external server.

40. An image display system comprising
a portable display apparatus; and
a plurality of client devices which communicate with the display apparatus,
wherein the display apparatus comprises:
a first display unit;
a first communication unit which wirelessly communicates with the plurality of client devices; and
a first controller which receives server software for displaying a sharing image and a plurality of personal images from an exterior server other than the plurality of client devices, and executes the server software, displays a personal image of the plurality of personal images on the first display unit of the display apparatus, selects a sharing client device for displaying the sharing image from among the plurality of client devices based on information of the plurality of client devices, wirelessly transmits information about the sharing image to the sharing client device via the first communication unit and wirelessly transmits information about another personal image of the plurality of personal images to a personal client device of the plurality of client devices excluding the sharing client device via the first communication unit, wherein the first communication unit, the first display unit and the first controller are disposed in the portable display apparatus, and wherein the personal client device comprises:
 a second display unit;
 a second communication unit which communicates with the display apparatus; and
 a second controller which controls the second communication unit to receive the information about the other personal image from the display apparatus, and processes and displays the received information on the second display unit.

41. The image display system according to claim 40, wherein personal contents containing information about a personal image are individually transmitted to the plurality of client devices excluding the sharing client device.

42. The image display system according to claim 41, wherein the personal client device further comprises a user input unit to manipulate the other personal image, and
 the second controller processes the other personal image corresponding to the user's input and transmits the user's input to the display apparatus, and the first controller changes the sharing image in accordance with the received user's input.

43. The image display system according to claim 41, wherein the personal client device further comprises a user input unit for manipulating the other personal image, and
 the second controller transmits the received user's input to the display apparatus.

44. The image display system according to claim 43, wherein the first controller transmits a changed personal image corresponding to the received user's input to the personal client device, and
 the second controller displays the changed personal image on the second display unit.

45. The image display system according to claim 43, wherein the first controller transmits data for changing the personal image corresponding to the received user's input to the personal client device, and
 the second controller changes the personal image on the basis of the data.

46. The image display system according to claim 41, wherein the display apparatus comprises at least one of a television, a large format display (LFD), and a table top display, and the personal client device comprises a personal portable client device.

47. The image display system according to claim 40, wherein each personal image of the plurality of personal images differs from another personal image.

48. The image display system according to claim 47, wherein the display apparatus further comprises a user input unit for a user's input, and
 the first controller changes the personal image displayed on the first display unit in accordance with a user's input when receiving the user's input through the user input unit or from the personal client device, and individually transmits data for changing other personal images to the plurality of client devices excluding the sharing client device and the sharing image to the sharing client device.

49. The image display system according to claim 40, wherein the plurality of client devices comprise at least one of a television, a large format display (LFD), and a table top display.

50. An image display method of an image display system comprising a portable display apparatus, a plurality of client devices wirelessly communicable with the display apparatus, the portable display apparatus comprising a communication unit, a display unit and a control unit, the image display method comprising:
 receiving by the display apparatus, server software for displaying a sharing image and a plurality of personal images from an exterior server other than the plurality of client devices;
 displaying by the display unit of the display apparatus, a personal image of the plurality of personal images;
 selecting by the control unit of the display apparatus, a sharing client device for displaying the sharing image from among the plurality of client devices based on information of the plurality of client devices; and
 wirelessly transmitting by the display apparatus, information about the sharing image to the sharing client device via the communication unit and wirelessly transmitting information about another personal image of the plurality of personal images to a personal client device of the plurality of client devices excluding the sharing client device via the communication unit,
 wherein the communication unit, the display unit and the control unit are disposed in the portable display apparatus.

51. The image display method according to claim 50, further comprising displaying the sharing image on the sharing client device, and wherein
 the transmitting comprises individually transmitting contents containing information about a personal image from the display apparatus to the plurality of client devices excluding the sharing client device.

52. The image display method according to claim 51, further comprising:
 receiving a user's input for manipulating the personal image;
 processing the personal image in accordance with the received user's input;
 transmitting the user's input to the display apparatus; and
 changing the sharing image in accordance with the received user's input.

53. The image display method according to claim 50, further comprising:
 receiving a user's input for manipulating the personal image; and
 transmitting the received user's input to the display apparatus.

54. The image display method according to claim 53, further comprising:
 transmitting a changed personal image corresponding to the user's input from the display apparatus to the personal client device; and
 displaying the changed personal image on the personal client device.

55. The image display method according to claim 53, further comprising:
 transmitting data for changing the personal image corresponding to the user's input from the display apparatus to the personal client device;
 changing the personal image on the basis of the data.

56. The image display method according to claim 50, wherein the transmitting the information comprises transmitting contents containing information about the sharing image to the sharing client device so that the sharing image is displayed on the sharing client device.

57. The image display method according to claim 56, wherein each personal image of the plurality of personal images differs from another personal image.

58. The image display method according to claim 57, wherein the display apparatus and the personal client device further comprise a user input unit for a user's input, and
the method further comprises:
 receiving a user's input through the user input unit or from the personal client device; and
 changing the sharing image and the personal image in accordance with the received user's input.

59. A portable display apparatus comprising:
 a communication unit which wirelessly communicates with a plurality of client devices;
 a display unit; and
 a controller which receives an application software for displaying a sharing image and a plurality of personal images from an exterior server other than the plurality of client devices through a network, and executes the application software so that the sharing image is displayed on the display unit of the portable display apparatus, selects a sharing client device for displaying the sharing image from among the plurality of client devices based on information of the plurality of client devices, wirelessly transmits information about the sharing image to the sharing client device via the communication unit and wirelessly transmits information about another personal image of the plurality of personal images to a personal client device of the plurality of client devices excluding the sharing client device via the communication unit,
 wherein the communication unit, the display unit and the controller are disposed in the portable display apparatus.

* * * * *